United States Patent [19]

Anderson et al.

[11] 4,262,785
[45] Apr. 21, 1981

[54] TORQUE RESPONSIVE HUB CLUTCH

[75] Inventors: Larry B. Anderson; Clark J. Hamkins, both of Racine, Wis.; Harry A. Petrak, Boulder, Colo.; David V. Schaefer, Burlington, Wis.

[73] Assignee: The Mechanex Corporation, Englewood, Colo.

[21] Appl. No.: 926,082

[22] Filed: Jul. 19, 1978

[51] Int. Cl.² .................. F16D 11/00; F16D 43/20
[52] U.S. Cl. ..................... 192/35; 192/54; 192/67 R; 403/1
[58] Field of Search ............ 192/50, 35, 67 R, 54, 192/31, 67 A; 403/1; 180/49

[56] References Cited

U.S. PATENT DOCUMENTS

| | | | |
|---|---|---|---|
| 2,884,101 | 4/1959 | Warn | 192/44 |
| 3,055,471 | 9/1962 | Warn et al. | 192/45 |
| 3,184,258 | 5/1965 | Kapusta | 403/1 |
| 3,217,847 | 11/1965 | Petrak | 192/31 |
| 3,414,096 | 12/1968 | Reed | 192/38 |
| 3,656,598 | 4/1972 | Goble | 192/35 |
| 3,669,476 | 6/1972 | Wilson | 192/67 R X |
| 3,718,213 | 2/1973 | Hegar et al. | 192/67 R |
| 3,753,479 | 8/1973 | Williams | 192/67 R X |
| 3,788,435 | 1/1974 | Prueter | 192/35 |
| 3,829,147 | 8/1974 | Ryswick | 192/54 X |
| 4,007,820 | 2/1977 | Kagata | 192/67 R |
| 4,079,821 | 3/1978 | Miller | 192/54 X |
| 4,163,486 | 8/1979 | Kagata | 192/67 R X |

Primary Examiner—Rodney H. Bonck
Attorney, Agent, or Firm—Thomas E. Torphy; James R. Hagen

[57] ABSTRACT

A clutch interposed between a hub mounted for rotation on a spindle and a selectively driveable axle which extends longitudinally through the spindle serves to engage the hub to the axle when the clutch is subjected to torque caused by placement of the axle in a dynamic or driving axle mode. When the axle is in a passive or non-driving axle mode the clutch serves to disengage the hub from the axle whereby the hub is free-wheeling on the spindle.

27 Claims, 8 Drawing Figures

TORQUE RESPONSIVE HUB CLUTCH

BACKGROUND OF THE INVENTION

To reduce component wear and increase fuel efficiency it has long been regarded as desireable to have two wheels, generally the front wheels, of a four wheel drive vehicle be selectively engageable or disengageable from the axles by which they are driven.

Four wheel drive vehicles, which are well known and currently in wide use as utility, recreational and military vehicles, are often operated in situations in which four driving wheels are neither necessary nor desirable. In such situations, such as on good roads, the front wheel drive train can be disengaged from the transmission and, additionally, the wheel hubs themselves can be disengaged from the stub axles by which they are driven. This arrangement allows the front wheels to free-wheel relative to the stub axles and enables the drive components between the hub and the transmission to remain dormant.

Disengagement of the wheel hub from the drive axle is most often accomplished by manual movement of a lock means from an engaged to a disengaged position. Conversely, when four wheel drive again becomes desirable it is generally necessary to manually move the lock means from the disengaged to the engaged position for each wheel of a pair of wheels.

Examples of prior art devices which are manually operated and in which one member is moved axially in response to manually exerted rotary force to engage or disengage the member from a complementary member are shown in U.S. Pat. Nos. 3,184,258; 3,669,476; 3,718,213; 3,753,479 and 4,007,820.

For safety and convenience it is desireable to have the wheel hub be engageable and disengageable from the axle without the need for manual effort to be exerted at each wheel hub. Achievement of hub to axle engagement automatically, in response to driving rotation of the axle, has been conceived using roller clutches. Examples of such devices are shown in U.S. Pat. Nos. 2,884,101; 3,055,471 and 3,414,096.

Torque responsive automatic hub clutches in which a member is moved axially to engage or disengage the hub and the axle are shown in U.S. Pat. Nos. 3,217,847 and 3,656,598.

Additionally, U.S. Pat. No. 3,829,147 shows a ball and cam arrangement whereby axial movement is obtained in response to torque.

Known past automatic hub locking devices have not achieved widespread commercial success due to several factors, such as sporadic or unreliable operation, lack of durability and/or prohibitive expense of manufacture.

SUMMARY OF THE INVENTION

This invention relates to a hub clutch for automatically engaging a drive gear drivingly connected to a drive axle to a ring gear drivingly connected to a wheel hub when torque is applied to the axle. Upon the application of torque to the axle relative motion occurs between the axle and a spindle surrounding a portion of the axle. Two members having axially opposed or facing surfaces are interposed between the drive gear and an end of the spindle. One member is forced to rotate when the drive gear rotates. The other member is prevented from rotating by being keyed to the spindle. Each member has a series of detents or recesses formed in the surface which faces the other member. The detents in each of the two surfaces are alignable so that an actuator member, such as a ball, can occupy a detent in each member.

Upon relative rotary motion between the two members the actuator ball is forced out of the detents to thereby force the two members axially further apart. As one member is affixed to the spindle and the other to the drive gear the axial increase in distance between the two members simultaneously forces the drive gear axially along a splined end of the axle into meshing and, consequently, driving engagement with the ring gear affixed to the wheel hub. The balls are also forced or cammed radially outwardly by the rotating detented member to avoid further contact between the actuator ball and the detents to assure that the drive gear remains meshed to the ring gear as long as the axle remains driven.

To disengage the drive gear on the axle from the ring gear on the hub the drive axle is placed in the non-driving or passive mode and the wheel is rotated in a direction opposite to that in which it was driven in the four wheel drive mode. Such rotation in the reverse direction for a short distance causes the clutch to automatically force the actuator balls back into detents whereby the drive gear is forced axially out of engagement with the ring gear by resilient means, such as a spring. Upon being so disengaged the wheel will be free-wheeling on the spindle until such time as the axle is again placed in the driving or dynamic mode.

DETAILED DESCRIPTION OF THE INVENTION

Figure 1:
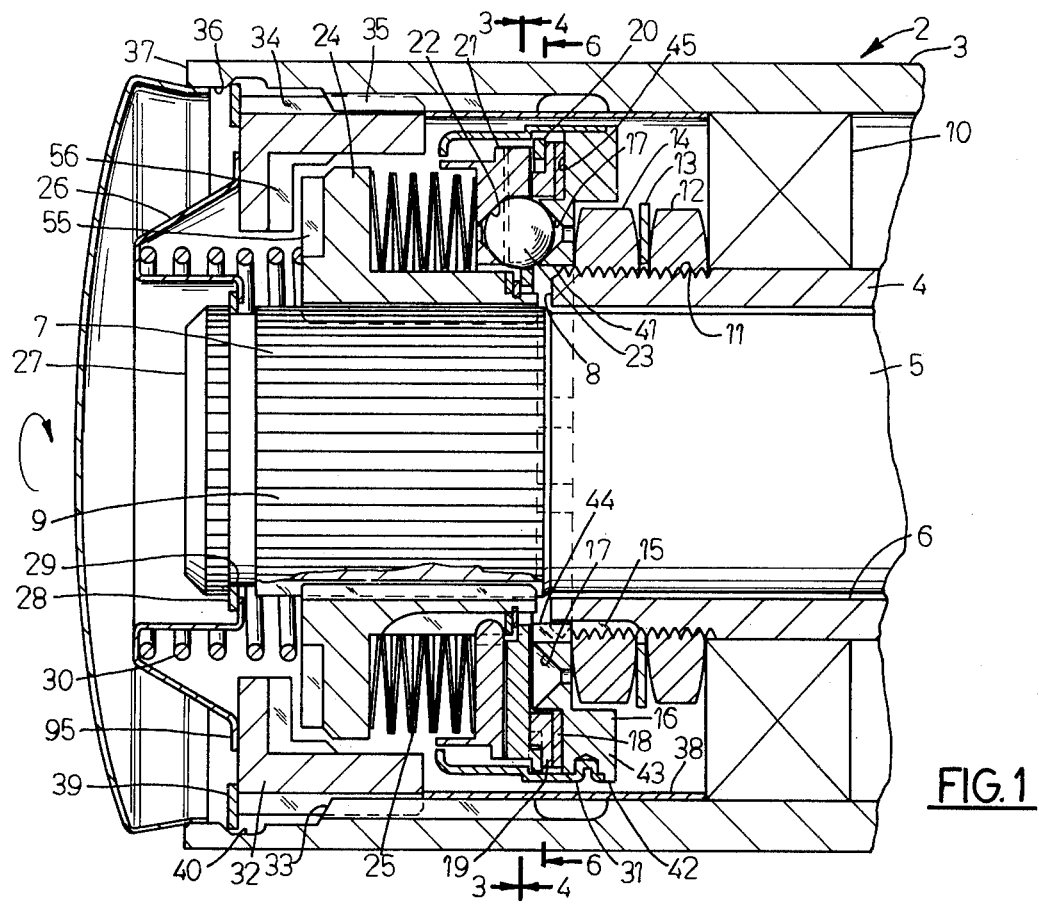
FIG. 1 is a full section view of a hub assembly having a hub clutch of this invention placed within a typical hub of the type which does not require a hub extension and in which the drive gear is disengaged from the ring gear.

A typical end portion of a wheel hub assembly 2 for a four wheel drive vehicle is shown in full section in FIG. 1. Assembly 2 is comprised of a wheel hub 3, a spindle 4 and a drive axle 5.

Spindle 4 is normally rigidly attached to suspension and steering components of the vehicle. These vehicle components are not shown as they form no part of the invention disclosed herein. Spindle 4 is not subject to rotation about its longitudinal axis.

To facilitate description of this invention the term "outboard" shall mean a direction parallel to the longitudinal axis of assembly 3 and away from the vehicle on which the assembly is mounted and "inboard" shall mean a direction parallel to the longitudinal axis of the assembly and toward the vehicle on which the assembly is mounted.

Drive axle 5 extends through or is journaled in a longitudinally extending opening 6 in spindle 4. Axle 5 has an outboard end portion 7 which extends axially outwardly beyond an outboard terminal end 8 of spindle 4. End portion 7 of axle 5 has a drive means, such as spline 9, which allows relative axial movement between the axle and a mating component and prevents relative rotational movement between the axle and the mating component. Drive axle 5 is capable of rotation about its longitudinal axis within opening 6 and may be selectively forced to rotate by a conventional well known drive train connecting the axle to a power transmission case selectively engageable with the transmission of a vehicle.

Wheel hub 3 is mounted in a radially outwardly concentric spaced relationship to spindle 4 and maintained in that spaced relationship by friction reducing means, such as conventinoal tapered roller bearings, of which only the outer or outboard bearing 10 is shown.

Threads 11 are provided on the outer surface of spindle 4 adjacent the outboard end 8 of the spindle. A positioning nut 12, position lock washer 13 and a jam nut 14 are placed adjacent end 8 of the spindle to maintain the hub in the desired axial position on the spindle. Hub 3 is coaxial with spindle 4 and is subject to rotation about the longitudinal axis of the assembly 3.

An axially extending keyway 15 is normally provided within a portion of the threaded portion of spindle 4.

The hub clutch of this invention is comprised of a first actuator means receiving member, such as annular detent ring 16, having a plurality of actuator means receiving means, such as recess or detent 17, a first bearing means 18, a second bearing means 19, an actuator means retaining member 20, a second actuator means receiving member, such as annular cam ring 21, having a plurality of actuator means receiving means, such as recess or detent 22, a plurality of actuator means, such as ball 23, and a drive gear 24 engaged to spline 9 to enable drive gear 24 to move axially relative to axle 5 and to prevent relative rotary motion between axle 5 and drive gear 24. A first resilient biasing means, such as belleville spring 25, is interposed between the drive gear 24 and the cam ring 21.

A retention means, such as annular spring retainer cup 26 is mounted on axle 5 and maintained substantially coaxial with axle 5 and in an axial spaced relationship to a terminal outboard end 27 of axle 5 by appropriate means, such as snap ring 28, engaged with an annular groove 29 in axle 5.

A second resilient biasing means, such as coil spring 30, is interposed between the retainer cup 26 and drive gear 24.

A substantially cylindrical member, such as shell 31, surrounds a substantial axial portion of the hub clutch assembly.

A ring gear 32 is affixed to a radially inner surface 33 of hub 3 by appropriate means, such as radially outwardly extending projections 34 on ring gear 32 which extend into complementary radially outwardly extending spaces 35 formed on hub 3 to prevent relative rotary motion between ring gear 32 and hub 3 and to enable the ring gear to be axially slid into the hub 3 through an opening 36 at an outboard end 37 of hub 3 and be therein axially affixed.

A spacer means, such as substantially cylindrical spacer tube 38, maintains the ring gear in an axial spaced relationship with bearing 10 and appropriate retention means, such as spring type retaining ring 39 in annular groove 40, maintains the ring gear in a desired axial position within the hub.

As shown in FIG. 1, annular detent ring 16 has a radially inwardly facing surface 41 defining a central opening in ring 16, a radially outwardly facing surface 42 coaxial with and radially outwardly spaced from surface 41 and a web 43 extending between surface 41 and surface 42. A key nib 44, also shown in FIG. 3, extends radially inwardly from a portion of surface 41. The central opening defined by surface 41 is appropriately sized to receive end 8 of spindle 4 and key nib 44 is appropriately sized to be received by keyway 15 formed in spindle 4. When detent ring 16 is mounted on the spindle the outboard side of jam nut 14 limits axial inboard movement of the detent ring, the spindle positions and maintains the detent ring concentric with the hub 3 and key nib 44 within keyway 15 prevents rotary movement of detent ring 16.

Figure 2:
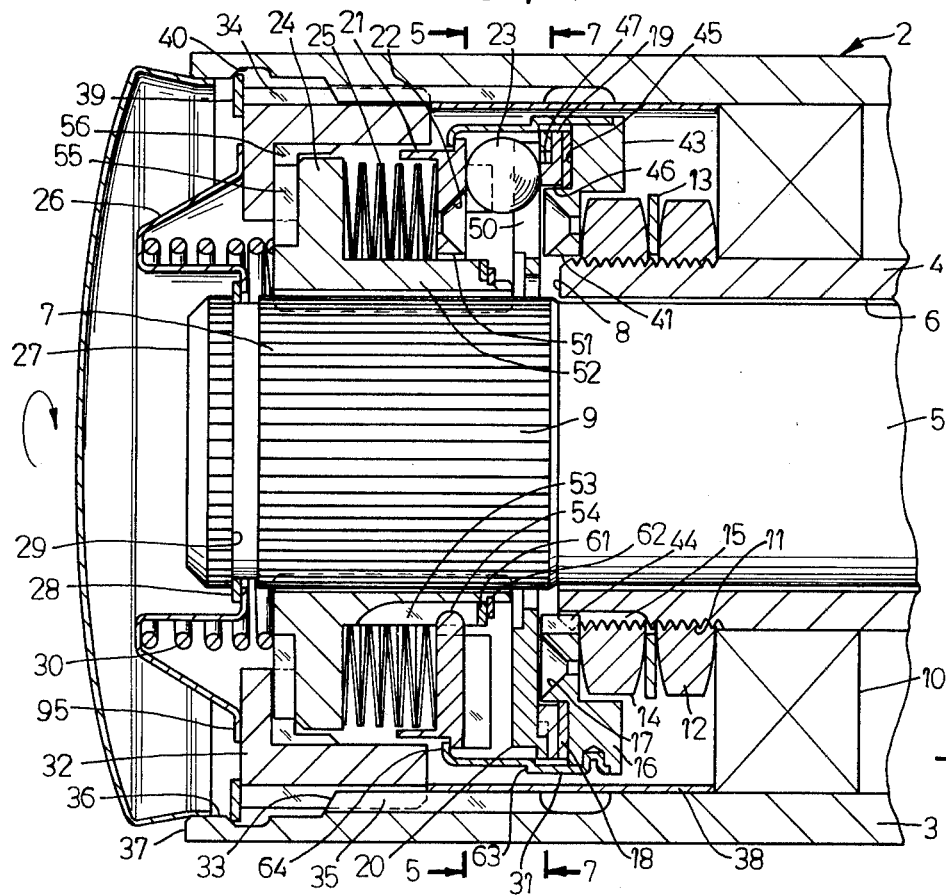
FIG. 2 is a full section view of the hub shown in FIG. 1 in which the drive gear is engaged with the ring gear.

Referring to FIG. 2, first bearing means 18 is an annular ring which rests on an axially outboard facing surface 45 of detent ring 16, is concentrically mounted on detent ring 16 relative to surface 41 and maintained in that concentric relationship by a radially outwardly facing axially outboardly extending shoulder surface 46 on web 43. While bearing means 18 may be comprised of a large variety of friction reducing materials and devices, it is preferably formed of oil impregnated sintered bronze.

Second bearing means 19 is also a substantially annular ring concentrically mounted on detent ring 16 relative to surface 41 and it also is maintained in that concentric relationship by the shoulder surface 46 on detent ring 16.

Second bearing means 19 is preferably formed of a material highly resistance to wear, such as hardened steel, as an axially inboardly facing surface of bearing 19 is subjected to surface contact and sliding travel over the outboardly facing surface of bearing 18. Bearing 19 has an axially outboardly extending shoulder 47 having a plurality of radially extending nibs 48 formed on it. Shoulder 47 and nibs 48 are more clearly shown in FIGS. 3, 6 and 7.

Figure 3:
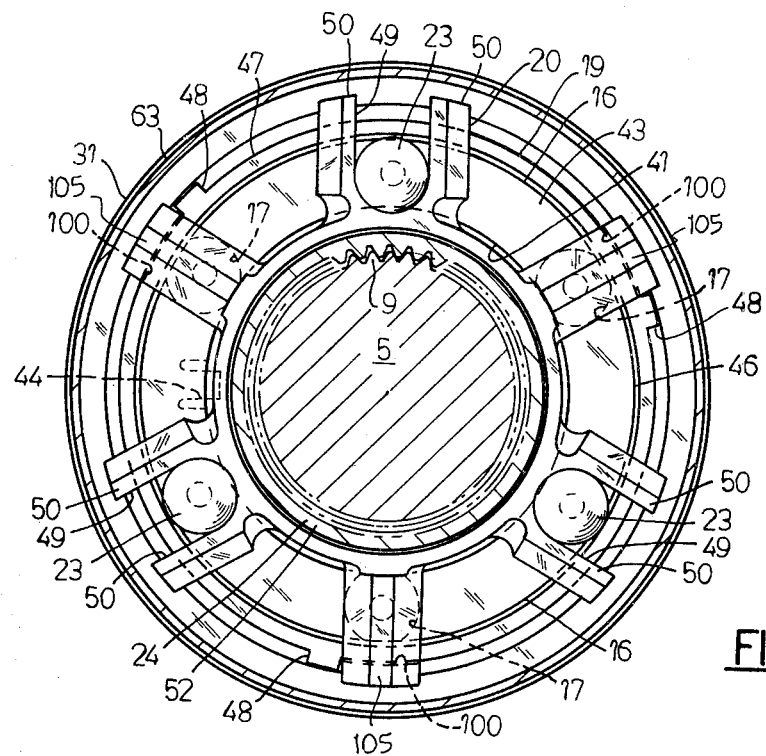
FIG. 3 is a full cross sectional view of the hub shown in FIG. 1, as indicated by the section line on FIG. 1.
Figure 6:
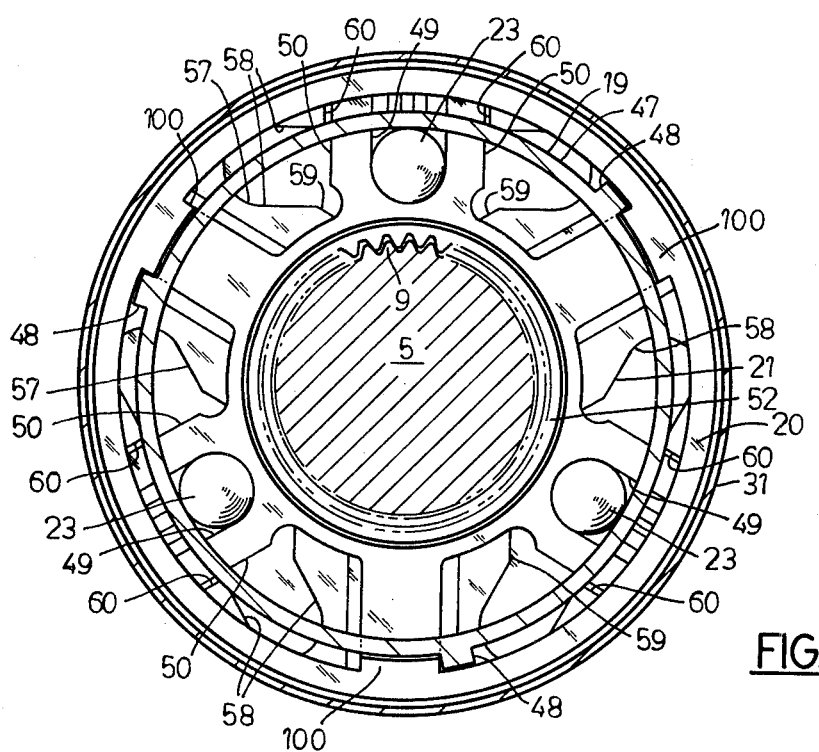
FIG. 6 is a full cross sectional view of FIG. 1, as indicated by the section line on FIG. 1.
Figure 7:
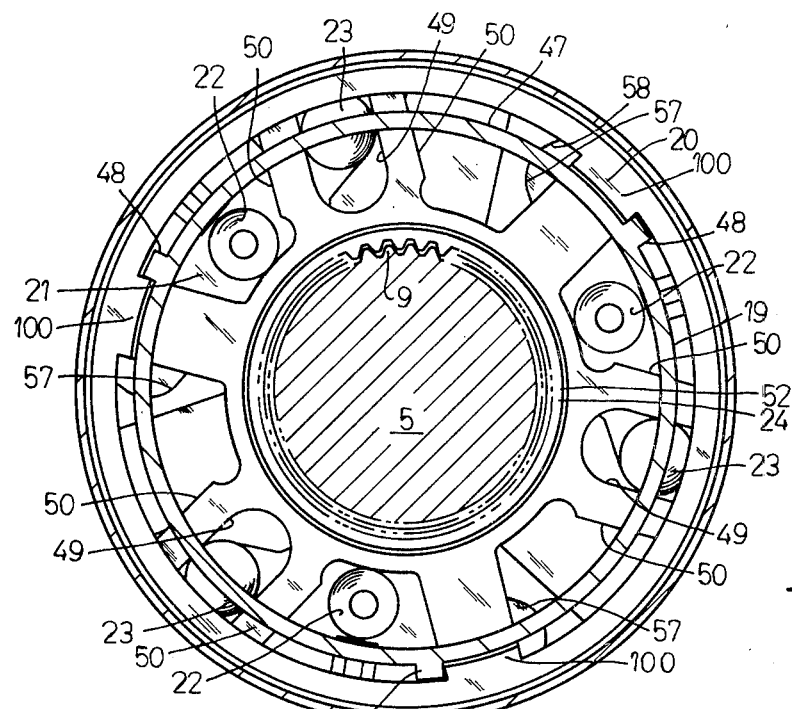
FIG. 7 is a full cross sectional view of FIG. 2, as indicated by the section line on FIG. 2.

Referring to FIG. 3, the actuator means retaining member or ball retainer 20 is essentially a ball cage having a plurality, in this case three, radially elongated ball retaining slots 49. Each slot 49 is appropriately sized relative to an actuator means, such as a ball 23, to confine the ball laterally, but enable it a limited amount of movement radially outwardly when the clutch is disengaged as shown in FIGS. 3 and 6 and a limited amount of movement radially inwardly when the clutch is engaged, as shown in FIG. 7. Retainer 20 has a plurality of radially inwardly extending nibs 100 positioned to engage nibs 48 in bearing 19 and, preferably, support members, such as support ribs 105.

As shown in FIGS. 2 and 3, each ball retaining slot has an axially outboardly extending wall 50 formed along each of its sides to aid in assuring that each of the balls 23 remains caged or restrained within its slot.

Detents 17 formed in detent ring 16 are arranged in an equally spaced circular pattern concentric about surface 41 of the detent ring. As shown in FIG. 3, the detents are arranged in an alignable relationship with the balls 23 when they are in their radially innermost position in slots 49 whereby when one ball 23 is aligned for being received within a detent each of the other balls is also aligned to be received within a detent. In the preferred embodiment shown six equally spaced detents are provided to reduce the amount of arcuate travel or rotary motion required by retainer 20 and each ball before the ball is aligned for reception by a detent.

Figure 4:
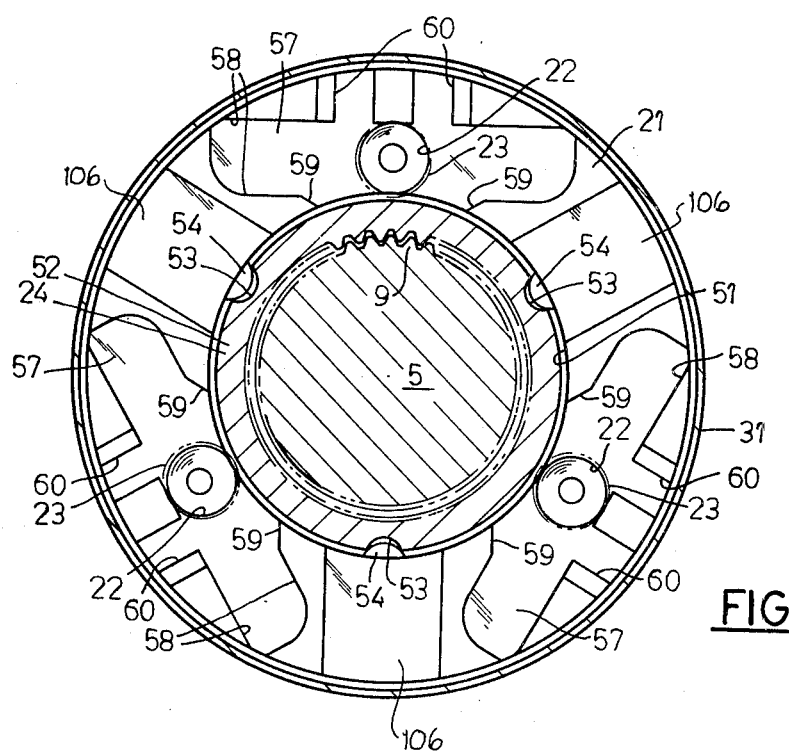
FIG. 4 is a full cross sectional view of the hub shown in FIG. 1, as indicated by the section line on FIG. 1.

FIG. 4, as indicated by the section line on FIG. 1, shows the axially inboardly facing face of cam ring 21. Ring 21 is a substantially annular ring having a radially inwardly facing surface 51 defining an opening appropriately sized to receive a substantially cylindrical portion 52 of drive gear 24. Three equally spaced axially elongated radially inwardly extending slots 53 are formed in cylindrical portion 52 of drive gear 24 and three radially inwardly extending projections 54 are equally spaced and rigidly positioned on surface 51 of cam ring 21. As shown, by virtue of the projections 54 extending into the slots 53, relative axial movement between cam ring 51 and drive gear 24 is permitted while relative rotational movement between cam ring 21 and drive gear 24 is prevented.

As previously stated, drive gear 24 is capable of axial movement along outboard end portion 7 of axle 5 and forced to rotate when the axle rotates due to spline 9 on the axle and therefore, when axle 5 is forced to rotate, drive gear 24 and cam ring 21 are forced to rotate with it.

Cam ring 21 is provided with three equally radially spaced ball receiving detents 22. The detents 22 are alignable with slots 49 in ball retainer 20 and with detents 17 in detent ring 16 whereby when each of the balls 23 is in substantially its radially innermost position within a slot 49 each of the balls 23 is aligned for being receivable within a detent 17 in detent ring 16 and with a detent 22 in cam ring 21. As shown in FIG. 1, when the balls are in the detents the cam ring 21 and drive gear 24 are at their innermost inboardly position, cam ring 21 and detent ring 16 are axially relatively close to each other and the axially outboardly facing gear teeth 55 on drive gear 24 are disengaged from the axially inboardly facing gear teeth 56 on ring gear 32 whereby the wheel hub 3 is free to rotate or free-wheel on spindle 4.

Again referring to cam ring 21 as shown in FIG. 4, each of the detents 22 is positioned in the center of a slot 57 defined by axially inboardly extending walls 58. On each of two lateral sides of each detent 22 a ball ramp 59 is formed by the slot defining wall 58 of each slot 57.

Figure 5:
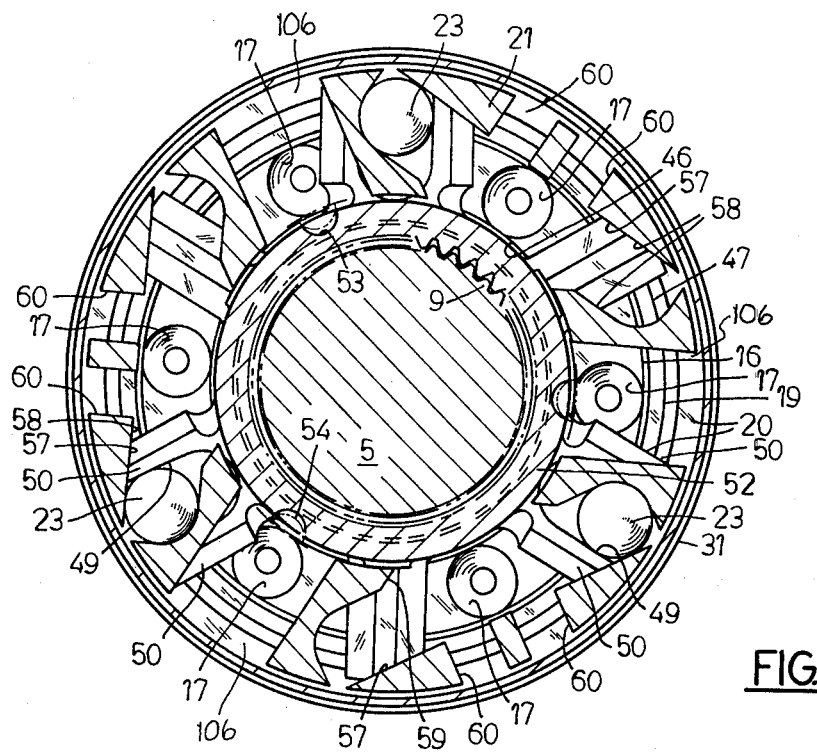
FIG. 5 is a full cross sectional view of the hub assembly shown in FIG. 2, as indicated by the section line on FIG. 2.

As more clearly shown in FIG. 5, a pair of substantially parallel substantially radially extending slots 60 are formed radially outwardly from each slot 57. Also, slots 106 are provided between slots 57 to receive axial extending wall portions of a plurality of support ribs 106 on ball retainer 20. Slots 60 are spaced to receive outboardly extending ball retention walls 50 on ball retainer 20 when the clutch is in the disengaged position shown in FIG. 1. By virtue of the axially extending walls 50 and support ribs 105 fitting into slots 60 and 106 respectively the outboardly facing position of ball retainer 20 and the inboardly facing portion of cam ring 21 intermesh to assure entrapment and retention of the balls within the slots 49 and detent 17 and 22 when the clutch is in the disengaged position. More importantly, by intermeshing the facing surfaces of the cam ring and the ball retainer the walls 50 of the ball retainer can be made higher, i.e. more axially extending, and therefore the balls are assured of remaining properly confined when they travel from a disengaged to an engaged position and vice versa.

As shown in FIG. 2, a washer 61 and snap ring 62 are mounted adjacent the inboard end of the cylindrical portion 52 of drive gear 24 to maintain the drive gear, belleville spring and cam ring as a subassembly.

As shown in FIG. 2, cylindrical shell 31 encircles detent ring 16 and extends axially outboardly. Shell 31 is rigidly affixed to detent ring 16 and thereby restrained from axial and rotary movement. Shell 31 has a first radially inwardly extending flange 63 and a second radially inwardly extending flange 64.

Flange 63 serves to maintain bearing 18, bearing 19 and ball retainer 20 axially entrapped between it and the outboardly facing surface of cam ring 16 which the inboardly facing surface of bearing 18 contacts. Flange 64 serves to limit axial outboard movement of cam ring 21 away from ball retainer 20 and detent ring 16 and thus serves to insure that the balls 23 will remained entrapped within the confines of cam ring walls 58 and ball retainer slot walls 50.

Shell 31 also maintains drive gear 34, belleville spring 25, cam ring 21, balls 23, ball retainer 20, bearing 19, bearing 18 and detent ring 16 as an assembled unit which only needs to have key nib 44 aligned with keyway 15 and the spline on the drive gear aligned with the spline on the axle to be slid axially inboardly into operative position in a wheel hub assembly.

Figure 8:
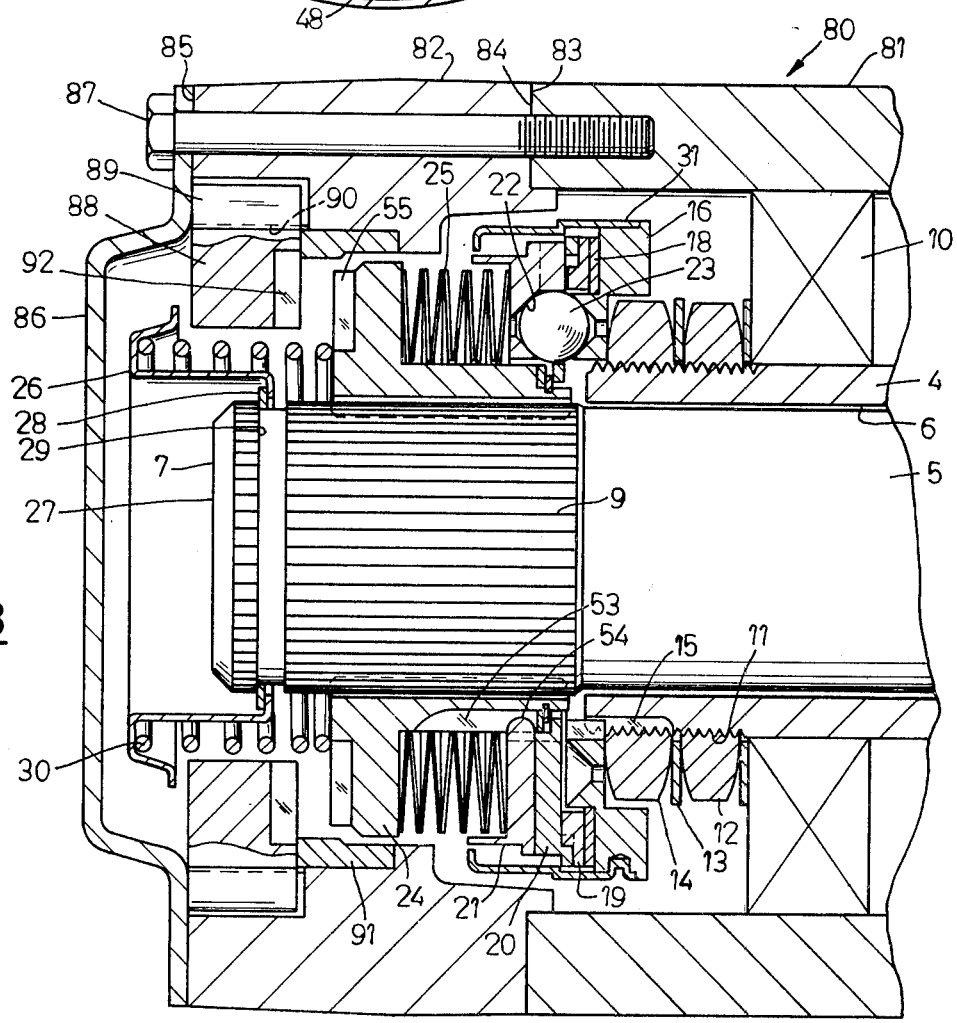
FIG. 8 is a full section view of a hub assembly having a hub clutch of this invention placed within a typical hub of the type which requires a hub extension and in which the drive gear is disengaged from the ring gear.

FIG. 8 shows a hub clutch of this invention installed into a wheel hub assembly 80. Hub assembly 80 is typical of a hub assembly in which the hub 81 does not extend beyond the terminal outboard end 7 of axle 5. Therefore an extension, such as substantially cylindrical extension number 82, is required to extend the hub axially outboardly to provide sufficient space for the hub clutch to be installed.

Extension 82 has a first inboard end 83 which sealingly engages an outboard end 84 of the hub and a second outboard end 85 which is sealed by a dust cover 86. The extension and dust cover are maintained sealingly engaged with the hub by appropriate means, such as by a plurality of bolts, such as bolt 87.

A ring gear 88 having radially outwardly extending teeth or projections 89 which engage complementary radially inwardly extending teeth 90 on hub extension 82 is positioned within the hub extension and these two components are forced to rotate together. A dual function annular drive gear guide and ring gear spacer 91 limits axial inward movement of the ring gear relative to the hub.

Axially inboardly facing gear teeth 92 on ring gear 88 are positioned to mesh with the complementary axially outboardly facing gear teeth 55 on drive gear 24.

Axial spacer and gear guide 91 serves to guide drive gear 24 into square, non-skewed engagement with teeth 92 on ring gear 88.

In all other significant respects all the components of the hub clutch are identical to those previously described above and the operation of the clutch is the same.

Operation of the hub clutch of this invention is as follows. Referring to FIG. 1, in which the hub 3 is shown disengaged from axle 5 because the drive gear is disengaged from the ring gear, the clutch will remain substantially in the position shown as long as no torque is applied to axle 5. Therefore, hub 3, and with it ring gear 32 and spacer tube 38, will free-wheel about spindle 4 and the other components. Flange 95 on spring return cup 26 is not normally in contact with the outboard end of ring gear 32 when the axle 5 is in the passive or non-driving mode.

When the drive train to axle 5 is placed in the engaged or driving mode the axle commences to rotate about its longitudinal axis and cam ring 21, both springs 25 and 30, spring return cup 26 and drive gear 24 commence to rotate along with it.

As detent ring 16 is prevented from rotation because key nib 44 is positioned in keyway 15 it does not rotate, nor does shell 31. Upon rotation of cam ring 21 each ball 23 is forced to move out of detents 22 and/or detents 17. The balls may move out of one set of detents first and then the other set of detents or they move out of both sets of detents simultaneously. What ever they do, they are forced to do it simultaneously because they are confined to equally spaced positions by the slots in ball retainer 20. The balls are rapidly forced to move out of both sets of detents upon rotation of the cam ring.

Referring to FIG. 5, as the balls move out of the cam detents they move axially with respect to the detents and through a short arc and encounter ball ramps 59 formed by slot walls 58 which define slots 57. Each ball ramp simultaneously urges each ball radially outwardly and the balls move radially outwardly along slot walls 58 until they reach the position shown in FIG. 5 whereby they are restrained from further radially outward movement by slot walls 58. As the balls move radially outwardly along slot walls 58 they simultaneously move radially outwardly in slots 49 of ball retainer 20 until they reach the radial outermost position shown in FIG. 7.

Referring to FIG. 2, it will be seen that the balls 23, upon being forced out of detents 17 and 22 force drive gear 24, via belleville spring 25 and cam ring 21 axially outboardly whereby cam ring 21 and detent ring 16 are relatively axially distant from each other and teeth 55 on drive gear 24 are forced into meshing engagement with teeth 56 on ring gear 32. Consequently, torque is then transmitted from the axle 5 through the drive gear to the ring gear affixed to the hub to render the hub a driven or powered hub.

Belleville spring 25 is interposed between the cam ring 21 and drive gear 24 to prevent component breakage in the event the gear teeth 55 and 56 are not aligned for meshing as the balls force the drive gear toward the ring gear. The belleville spring enables the cam ring to move axially outboardly separate from the drive gear in response to the force of the balls if the crests of the teeth try to engage each other. The belleville spring also resiliently urges the drive gear teeth into meshing engagement with the ring gear teeth as soon as the teeth crests are forced out of direct interference with each other.

In FIG. 2 it can be seen that the balls are confined between bearing 19 and an axially inboardly facing surface of slot 57. Also the balls are prevented from moving out of slot 57 by the axially inboardly extending slot defining walls 58 and they are prevented from moving out of ball retainer slots 49 by the axially outboardly extending walls 50. Therefore, the balls will remain in the position shown in FIGS. 2, 5 and 7 as long as the axle 5 remains in the driving mode and is driven in the same direction which impelled the balls into their radially outermost position. Thus, the teeth of the drive gear remain meshed with the teeth of the ring gear and the hub remains driven by the axle.

In the position shown in FIG. 2 each ball rotates about the longitudinal axis of the hub assembly but they do not rotate about their own center.

Rather, movement of each ball about its center is generally non-existent because the radially inwardly extending nibs 100 on ball retainer 20, as shown in FIG. 6, rotate along with ball retainer 20 as the balls are forced out to their radially outermost position. Each of the nibs 100, after rotation of ball retainer 20 through a short arc, engage a radially outwardly projecting nib on bearing 19 and due to this engagement bearing 19 is forced to rotate along with the ball retainer 20, the balls 23 and the other rotating components of the hub clutch, as described above.

Due to the forced rotation of bearing 19 relative rotational movement is forced to occur between bearing 19 and the axially outboardly facing surface of bearing 18 and/or between the axially inboardly facing surface of bearing 18 and the axially outboardly facing surface of detent ring 16 with which bearing 18 interfaces.

Functionally, it is immaterial which surface or surfaces slide with respect to the other as the lubricant impregnated bearing 18 has substantially identical antifriction properties on each its axial outboard facing and axial inboard facing sides. However, as a matter of common sense manufacturing economics, it appears preferable to have bearing 18 remain stationary as this precludes the necessity of having a finely ground surface on detent ring 16 over which bearing 18 can slide.

When it is desired to disengage the axle from the transmission to place the axle 5 in its passive or non-driven mode the wheel hub is rotated in a direction opposite to that in which it was driven in the four wheel drive mode. Assuming the vehicle was being driven forward in four wheel drive, disengagement of the axle from the hub is accomplished by disengaging the drive axle drive train from the transmission and backing the vehicle up a short distance, such as ¼ to ⅓ of a wheel revolution, in two wheel drive. Alternately, the vehicle may be backed up a short distance in four wheel drive, the four wheel drive train can then be disengaged, and the hubs will be free-wheeling with respect to the spindles.

Rotation of the wheel hub in the opposite direction when the axle is not driven causes each ball to rotate about its center because each ball has less resistance to roll about its center than the resistance bearing 19 has to rotate with respect to detent ring 16 due to the presence of sliding friction between the bearing 19 and the detent ring via bearing 18.

Each ball, urged by the camming force of slot walls 58, thus rolls off bearing 19, all the balls moving simultaneously due to being caged in ball retainer 20, and, traveling along an arcuate path with a diminishing radius, move radially inwardly to the radially innermost position in ball retainer slots 49 to be alignable for reception in a detent 22 in the substantial center of each slot 57 in cam ring 21 and a detent 17 in detent ring 16 and the drive gear is simultaneously forced axially inboardly by the resilient urging of spring 30 for disengaging drive gear teeth 55 from ring gear teeth 56 to render hub 3 free-wheeling with respect to axle 5. Spring 25 is preferably somewhat stronger than spring 30 to assure that the drive gear and cam ring are urged axially inboardly as a substantially rigid unit to assure that each actuator ball ends up in a detent 17 and a detent 22 and remains there.

If the vehicle is driven in four wheel drive and the direction of drive is reversed the balls are forced or cammed by slot walls 58 to roll radially inwardly. The ball retainer 20 rotates through a short arc, such as 80° to 90°, while the balls go into detents, are immediately forced out and go to the opposite end of the slot. The balls again end up at a radially outermost position between cam ring 21 and bearing 19, the radially inwardly projecting nibs 100 on ball retainer 20 again engage the radially outwardly projecting nibs on bearing 19 and the balls once again rotate about the axis of hub 3, but not about their own centers, and the drive gear is drivingly engaged with the ring gear. During such reversals of direction of the vehicle in four wheel drive the clutch disengages and substantially immediately reengages the drive gear with the ring gear to provide a substantial continuity of driving force to the wheel hub.

What is claimed is:

1. In a clutch for engaging a driveable axle journaled in a non-rotatable spindle to a hub concentric with and mounted for rotation about said spindle, a portion of said axle extending axially beyond a terminal end of said spindle, the improvement comprising:
    a first actuator member having a central aperture for receiving a portion of said spindle;
    first engaging means for affixing said first actuator member to said spindle for preventing rotation of said first actuator member relative to said spindle; actuator means;
    a second actuator member having a central aperture for receiving said axle, said second actuator member having a drive means;
    second engaging means for affixing said second actuator member to said axle for enabling said second actuator member to move axially with respect to said axle and for assuring rotation of said second actuator member when said axle rotates;
    said first actuator member having a first working surface axially facing toward said second actuator member, said second actuator member having a second working surface axially facing toward said first working surface of said first actuator member;
    first actuator means receiving means in said first actuator member, said first receiving means having a first receiving end on said first working surface and said first receiving means extending axially away from said second actuator member, said first receiving means being for receiving at least a portion of said actuator means for enabling said received portion of said actuator means to be axially further away from said second working surface than said second working surface is from said first working surface;
    second actuator means receiving means in said second actuator member, said second receiving means having a first receiving end on said second working surface and said second receiving means extending axially away from said first actuator member, said second receiving means being for receiving at least a portion of said actuator means for enabling said portion of said actuator means received within said second receiving means to be axially further away from said first working surface than said second working surface is from said first working surface;
    said first receiving means and said second receiving means being alignable for enabling each of said receiving means to simultaneously receive a portion of said actuator means for enabling said first working surface and said second working surface to be relatively axially close together for enabling said drive means on said second actuator member to be out of driving engagement with a hub drive means on said hub when said second actuator member is not forced to rotate with respect to said first actuator member and whereby upon rotation of said second actuator member with respect to said first actuator member said actuator means is forced out of said first and said second receiving means and forced between said first working surface and said second working surface for forcing said second actuator member to slide axially away from said first actuator member along said axle for forcing said drive means into engagement with said hub drive means on said hub for causing said hub to rotate when said axle rotates.

2. The invention as defined in claim 1 in which said first receiving means in said first working surface is a first detent and said second receiving means in said second working surface is a second detent and said actuator means is a spherical ball whereby when said second actuator member is not subject to rotation with respect to said first actuator member a portion of said ball is received within said first detent and a substantially diametrically opposed portion of said ball is received in said second detent for enabling the axial distance between said first and said second working surfaces to be less than the diameter of said ball and upon rotation of said second actuator member with respect to said first actuator member said ball is forced from each said first detent and said second detent whereby said ball is forced between said first working surface and said second working surface for forcing said second actuator member to move axially away from said first actuator member and said drive means is consequently forced into engagement with said hub drive means.

3. The invention as defined in claim 1 in which said actuator means is comprised of a plurality of equal diameter spherical balls and said first receiving means is comprised of a plurality of equally spaced truncated cone shaped detents arranged in a circular pattern concentric with said spindle and said first working surface is positioned radially outwardly from said detents and said second receiving means is comprised of a plurality of equally spaced truncated cone shaped detents arranged in a circular pattern concentric with said axle and said second working surface is positioned radially outwardly from said detents and each of said detents on said first actuator member is axially alignable with a detent on said second actuator member for enabling each of said plurality of balls to be simultaneously received within a detent in said first actuator member and a detent in said second actuator member for enabling said axial distance between said first working surface and said second working surface to be less than the diameter of said balls.

4. The invention as defined in claim 3 together with cam means affixed to said second working surface adjacent each of said detents on said second actuator member for aiding in forcing said balls out of said detents in said first actuator member and for camming said balls radially outwardly from said detents for causing said balls to be positioned between said first working surface and said second surface.

5. The invention as defined in claim 4 in which said first working surface is comprised of a bearing means concentric with and radially outwardly spaced from said first receiving means, said bearing means being rotatable with respect to said first actuator member whereby said plurality of balls upon being forced out of said detents are cammed radially outwardly to be positioned between said first working surface and said second working surface and said second actuator member, said balls and said bearing means rotate with respect to said first actuator member.

6. The invention as defined in claim 5 together with ball retainer means interposed between said first working surface and said second working surface, said ball retainer means having a plurality of ball retaining slots whereby each of said balls is retained in a slot for confining said balls between said first actuator member and said second actuator member.

7. The invention as defined in claim 6 in which said ball retaining slots are a plurality of equally spaced radially extending slots in which each of said balls is laterally confined and allowed a limited degree of radial movement whereby when each of said balls is positioned at a radial innermost portion of a slot said ball is alignable with a detent in each said first actuator member and said second actuator member and when each of said balls is positioned in each of said slots remote from said radially innermost position in said slot none of said balls are alignable with a detent in either said first actuator member or said second actuator member for maintaining said first working surface and said second working surface a distance apart equal to the diameter of said balls for maintaining said drive means of said second actuator member engaged with said hub drive means.

8. The invention as defined in claim 7 together with interengaging means between said ball retainer means and said bearing means whereby said bearing means is forced to rotate when said ball retainer means rotates.

9. The invention as defined in claim 8 in which said interengaging means is comprised of at least one radially inwardly extending nib on said ball retainer means and at least one radially outwardly extending nib on said bearing means and said nibs are positioned to engage each other whereby when said ball retainer means is forced to rotate said nib on said ball retainer means engages said nib on said bearing means for forcing said bearing means to rotate with said ball retainer means.

10. The invention as defined in claim 9 together with axially extending walls defining each slot in said ball retainer means, said axially extending walls extending from said ball retainer means toward said second actuator member whereby when said second actuator member is forced away from said first actuator member said axially extending walls aid in maintaining said balls retained in each of said slots.

11. The invention as defined in claim 10 together with a substantially cylindrical shell surrounding are substantially rigidly affixed to said first actuator member, said cylindrical shell extending axially beyond a portion of said second actuator member and having radially inwardly extending means entrapping at least a portion of said second actuator member in said shell whereby said shell maintains said first actuator member, said actuator means, said retainer means and said second actuator member as an assembled unit and limits axial movement of said second actuator member away from said first actuator member.

12. In a hub clutch for engaging a driveable axle journaled in a non-rotatable spindle to a hub mounted for rotation on said spindle, said hub having a first hub drive means engaged for rotation with said axle and axially moveable with respect to said axle for moving into and out of driving engagement with said hub drive means and biasing means for resiliently urging said second drive means axially away from said first hub drive means, the improvement comprising:

an actuator ball;

retaining means having a radially extending elongated slot for laterally confining said ball and for enabling said ball radial movement within said slot;

a first actuator member having a first engaging means for being non-rotatably affixed to said spindle, said first actuator member having a first working surface axially facing toward a first side of said actuator ball and said retaining means for contacting said actuator ball, said first working surface having a first recess for receiving a portion of said actuator ball;

a second actuator member affixed to said second drive means for rotational and axial movement with said second drive means, said second actuator member having a second working surface axially facing toward a second side of said actuator ball and said retaining means for contacting said actuator ball, said second working surface having a second recess for receiving a portion of said ball, said second recess being axially alignable with said first recess for enabling a first portion of said ball to be received in said first recess and a second portion of said ball to be received in said second recess simultaneously for enabling the axial distance between said first working surface and said second working surface to be less than the diameter of said ball for enabling said biasing means to urge said second drive means out of engagement with said first hub drive means when said second member is not rotating relative to said first actuator member; and cam means adjacent said second recess in said second working surface of said second member, said cam means having urging means for forcing said actuator ball radially outwardly in said slot in said ball retainer upon rotation of said second member relative to said first member;

whereby upon rotation of said axle said second actuator member rotates relative to said first actuator member and said actuator ball is forced out of said first recess in said first working surface and out of said second recess in said second working member for forcing said second member and said second drive means axially along said axle against the urging of said biasing means for causing said second drive means on said axle to drivingly engage said first hub drive means on said hub and said cam means forces said actuator ball radially outwardly in said slot in said retaining means and maintains said ball between said first working surface and said second working surface for maintaining said second drive means engaged with said first hub drive means.

13. The invention as defined in claim 12 in which a portion of said first working surface of said first actuator member is rotatable with respect to said first actuator member whereby said actuator ball is maintained between said rotatable portion of said first working surface and said second working surface when second member is forced to rotate for causing said actuator ball to rotate about said axle and said actuator ball is not impelled to rotate about its own center.

14. The invention as defined in claim 13 in which said cam means is comprised of a cam slot substantially surrounding said second recess and having said second working surface as a bottom, said slot being defined by axially extending walls affixed to said second working surface and axially extending toward said actuator ball whereby upon rotation of said second actuator member relative to said first actuator member said walls cam said ball radially outwardly.

15. The invention as defined in claim 14 in which said first working surface has a plurality of first recesses arranged equally spaced in a circular pattern concentric with said spindle and said second working surface has a plurality of second recesses arranged equally spaced in a circular pattern concentric with said axle and said first recesses and said second recesses are alignable for receiving a ball simultaneously and said retaining means has a plurality of radially spaced elongated slots and said actuator ball is comprised of a plurality of balls with one ball in each slot and each of said balls is alignable with a recess in each said first working surface and said second working surface and each of said plurality of recesses on said second working surface is substantially surrounded by a cam slot.

16. The invention as defined by claim 14 in which said portion of said first working surface which is rotatable with respect to said first actuator member is a substantially annular bearing means radially outwardly spaced from said first recess and concentric with said spindle and a portion of said ball rests on said bearing means when said axle rotates with respect to said spindle.

17. The invention as defined in claim 16 in which said bearing means is comprised of a first substantially annular bearing member mounted concentric with an axially extending shoulder on said first actuator member and a second substantially annular member mounted concentric with said axially extending shoulder on said first member and said first bearing member has a first axially facing surface in surface contact with an axially facing surface on said first actuator member and a second axially facing surface axially facing in a direction opposite to that of said first axially facing surface and said second bearing member having a third axially facing surface in surface contact with said second axially forcing surface of said first bearing member and a fourth axially facing surface comprising said rotatable portion of said first working face of said first actuator member whereby said second bearing member is in sliding friction contact with said first bearing member for causing said second bearing member to have greater resistance to rotation with respect to said first actuator member than each of said actuator balls has resistance to rotate about its own center for causing each of said actuators balls to roll about its own center on said second bearing means when said second actuator member is rotated in a direction opposite to the direction of rotation which forced said balls onto said second bearing member.

18. The invention as defined in claim 15 together with a cylindrical shell having a first end substantially rigidly affixed to a peripheral portion of said first actuator member, said shell extending axially from said first actuator member toward said first hub drive means and terminating in a second end having a first limit means for engaging a portion of said second actuator member for limiting axial movement of said second actuator member away from said first actuator member.

19. The invention as defined in claim 18 together with a second limit means affixed to said shell intermediate said first end and said second end of said shell, said second limit means for maintaining a perpheral portion of said retainer means, said first bearing means and said second bearing means positioned between said first actuator member and said second limit means.

20. The invention as defined in claim 12 in which said second actuator member is affixed for rotation with said second drive means and enabled axial motion with respect to said second drive means and a resilient means is positioned between said second actuator member and said second drive means for enabling said second actuator to yieldingly move axially toward said first hub drive means separate from said second drive means when said second drive means interferingly engages said first hub drive means for preventing component breakage of said clutch.

21. The invention as defined in claim 20 in which the force exerted on said second drive means by said biasing means for urging said second drive means out of engagement with said first hub drive means is less than the force said resilient means exerts between said second actuator member and said second drive means for assuring that said second drive means and said second actuator member are urged axially away from said first hub drive means as a unit.

22. In a wheel hub assembly for a four wheel drive vehicle, said assembly having a selectively driveable axle journaled in a non-rotatable spindle and a hub radially outwardly spaced from said spindle and mounted for rotation about said spindle, said axle having a portion axially extending beyond a terminal end of said spindle, said hub having a first hub drive means affixed to said hub for rotation with said hub and said axle having a second drive means engaged with said portion of said axle which extends axially beyond said terminal end of said spindle, said second drive means being engaged for rotation with said axle and for enabling said second drive means to move axially with respect to said axle, wherein the improvement comprises:
a substantially annular detent ring affixed to said spindle to prevent rotational movement of said detent ring, said detent ring having a plurality of equally spaced detents arranged in a circular pattern concentric with said spindle and a first working surface surrounding said detents and axially facing toward said first hub drive means;
a substantially annular cam ring, said cam ring being engaged to said second drive means whereby when said second drive means rotates said cam ring rotates and when one of said second drive means and said cam ring is forced to move axially with respect to said axle said other of said second drive means and said cam ring is forced to move axially with respect to said axle, said cam ring having a plurality of equally spaced detents arranged in a circular pattern concentric with said axle and a second working surface surrounding said detents, said second working surface axially facing toward said first working surface on said detent ring;
a plurality of substantially equal diameter actuator balls disposed between said detent ring and said cam ring;
a ball retainer having a plurality of ball retaining slots, said ball retainer being disposed between said detent ring and said cam ring and each of said plurality of actuator balls being disposed in ball retaining slot in said ball retainer, each of said ball retaining slots of said ball retainer being substantially radially extending for enabling a ball disposed in a slot radial movement and each of said slots having a lateral dimension substantially equal to the diameter of said balls for preventing a ball disposed in a slot each of lateral movement separate from said slot, whereby when each of said actuator balls is at a radially innermost position in a slot said balls is alignable for being partially received within a detent in said detent ring and within a detent in said cam ring and when each of said balls is at a radially outermost position in a slot each of said balls is disposed between said first working surface and second working surface and is not aligned for being received within a detent in either said detent ring of said cam ring;

cam means adjacent each of said detents on said cam ring for aiding in forcing each of said balls from a first radial position to a second radial position and for forcing said balls from a second radial position to a first radial position; and biasing means for urging said second drive means axially away from said first hub drive means and consequently urging said cam ring toward said detent ring;

whereby when said axle is forced to rotate said second drive means and said cam ring are forced to rotate with said axle for causing each of said actuator balls to be forced from said detents in each said cam ring and said detent ring for forcing said cam ring and second drive means axially away from said detent ring for forcing said second drive means into driving engagement with said first hub drive means for rendering said hub a driven hub and said cam means forces each of said actuator balls radially outwardly to a position between said first working surface on said detent ring and a second working surface on said cam ring for maintaining said second drive means drivingly engaged with said first drive means as long as said axle is forced to rotate in the direction of rotational movement which forced the balls out of the detents.

23. The invention as defined in claim 22 in which a portion of said first working surface on said detent ring is comprised of bearing means rotatable with respect to said detent ring, said bearing means being concentric with and radially outwardly spaced from said detents on said detent ring whereby when said actuator balls are cammed radially outwardly by rotation of said cam ring with respect to said detent ring said balls are forced between said bearing means and said second working face on said cam ring and said cam ring, said balls, said ball retainer and said bearing means rotate with respect to said detent ring when said axle rotates.

24. The invention as defined in claim 23 together with ball retainer and bearing means interengaging means whereby when said ball retainer is forced to rotate said interengaging means forces said bearing means to rotate with said ball retainer.

25. The invention as defined in claim 24 in which said interengaging means is comprised of at least one radially inwardly extending nib on said ball retainer and at least one radially outwardly extending nib on said bearing means and said nibs are aligned for engaging each other upon rotation of said ball retainer with respect to said detent ring for forcing said bearing means to rotate with said ball retainer.

26. The invention as defined in claim 25 in which said bearing means is comprised of a substantially annular bearing ring mounted on said detent ring, said bearing ring being in surface to surface sliding contact with respect to said detent ring whereby when said interengaging means is not engaged and said cam ring is forced to rotate with respect to said detent ring the force required to cause said bearing ring to rotate with respect to said detent ring is greater than the force required to impel each of said balls to rotate about its own center for causing said balls to roll with respect to said bearing ring.

27. The invention as defined in claim 22 in which said second drive means has a cylindrical portion having a plurality of equally spaced radially outwardly facing axially extending elongated slots and said cam ring has a central aperture for receiving said cylindrical portion of said second drive means, said central aperture having a plurality of equally spaced radially inwardly extending projections, each of said projections being disposed within a slot and a resilient means interposed between said second drive means and said cam ring whereby said cam ring is forced to rotate when said second drive means rotates and said cam ring can yieldingly move axially with respect to said second drive means for preventing component breakage when said second drive means is forced into interfering engagement with said first hub drive means.

* * * * *

UNITED STATES PATENT OFFICE
CERTIFICATE OF CORRECTION

PATENT NO. : 4,262,785
DATED : April 21, 1981
INVENTOR(S) : Larry B. Anderson, et. al It is certified that error appears in the above-identified patent and that said Letters Patent are hereby corrected as shown below:

Column 3, line 1, delete "3" and substitute -- 2 -- therefor; line 23, delete "conventinoal" and substitute -- conventional -- therefor; line 31, delete "3" and substitute -- 2 -- therefor.

Column 4, line 51, after "plurality" add -- of --.

Column 5, line 27, before "forced" add -- is --.

In The Claims:

Claim 11, line 2 (Column 11), delete "are" and substitute -- and -- therefor.

Claim 12, line 4 (Column 12), after "means" add -- and said axle having a second drive means --; line 6, before "hub" add -- first --.

Claim 19, line 4 (Column 14), delete "perpheral" and substitute -- peripheral -- therefor.

Claim 22, line 9 (Column 15), delete "each of"; line 11, after "slot" add -- each of --; line 17, before "second" add -- said --; and, line 18 delete "of" and substitute -- or -- therefor.

Signed and Sealed this

Eleventh Day of August 1981

[SEAL]

Attest:

Attesting Officer

GERALD J. MOSSINGHOFF

Commissioner of Patents and Trademarks